Oct. 10, 1950 — G. MILLER — 2,525,367
TRACTION CLEAT
Filed June 8, 1948
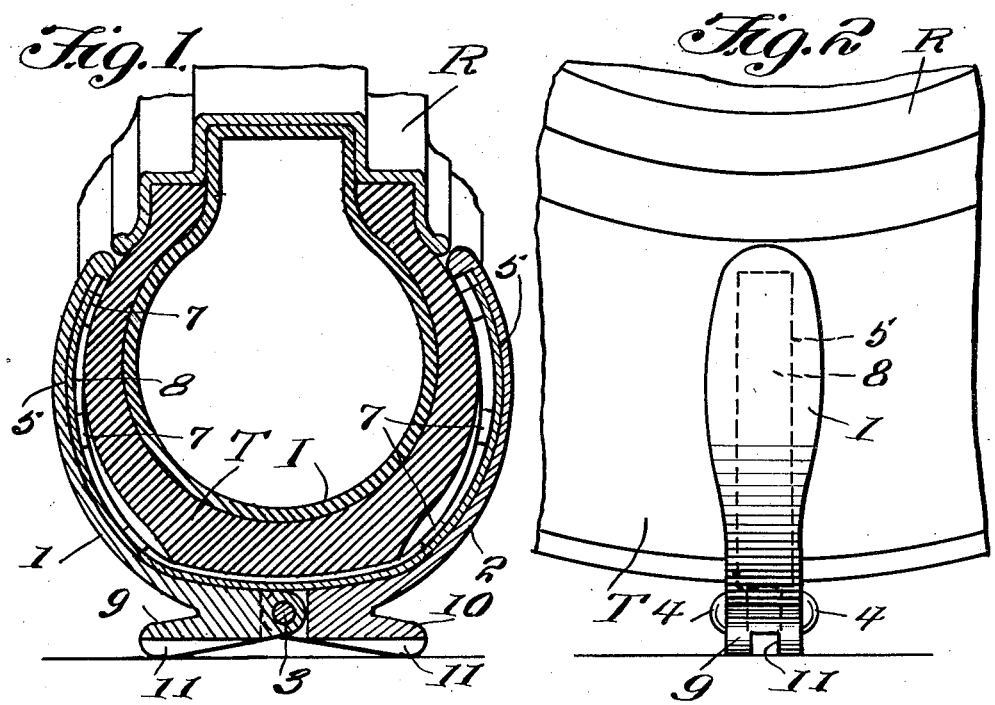
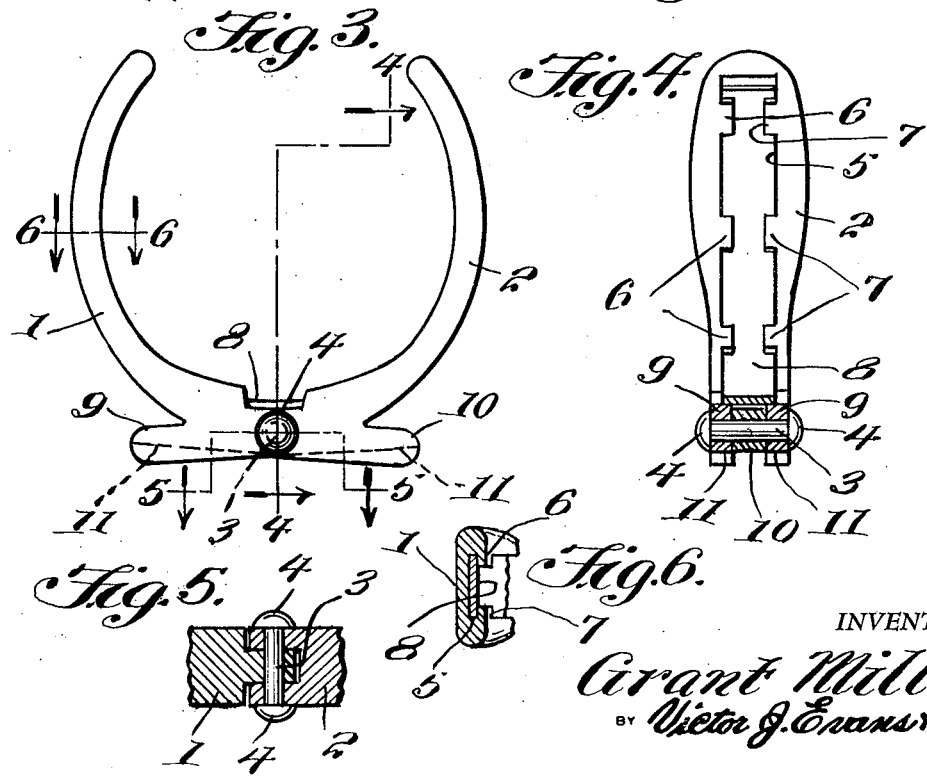
INVENTOR.
Grant Miller,
BY Victor J. Evans & Co.
ATTORNEYS Patented Oct. 10, 1950

2,525,367

UNITED STATES PATENT OFFICE 2,525,367

TRACTION CLEAT

Grant Miller, Washington, D. C.

Application June 8, 1948, Serial No. 31,752

4 Claims. (Cl. 152—225)

My present invention relates to the general class of resilient tires and wheels having demountable ground engaging parts or deformable traction devices, and more specifically to an improved traction cleat for emergency use with pneumatic tires of automotive vehicles, especially in extracting the vehicle when stalled in snow, ice, or mud. The primary object of the invention is the provision of one or more traction cleats for mounting on the tire of a wheel, which are light in weight to permit easy manipulation in mounting and dismounting them from the wheel, and which are so constructed as to grip the tire under pressure from ground-engaging means of the cleats, to insure rigid retention of the cleat in operative position on the tire. The cleat of my invention includes a minimum number of parts that may with facility be manufactured at low cost of production, and the parts may be assembled with convenience to provide a traction device that is simple in construction, durable, and which may be manipulated with ease in mounting it on and dismounting it from the wheel tire.

The invention consists in certain novel features of construction and combinations and arrangements of parts as will hereinafter be described, and more particularly set forth in the appended claims. In the accompanying drawings I have illustrated a complete example of a physical embodiment of my invention in which the parts are combined and arranged in accord with one mode I have so far devised for the practical application of the principles of my invention. It will however be understood that changes and alterations are contemplated and may be made in these exemplifying drawings and mechanical structures, within the scope of my claims, without departing from the principles of the invention.

Figure 1 is a transverse vertical sectional view through a pneumatic tire and the cleat of my invention.

Figure 2 is an exterior side view of the structure of Fig. 1.

Figure 3 is a view in elevation of the cleat, detached.

Figure 4 is a central sectional view of the cleat at line 4—4 of Fig. 3.

Figure 5 is a detail sectional view at line 5—5 of Fig. 3; and Figure 6 is a sectional detail view at line 6—6 of Fig. 3.

In order that the general relation of parts and utility of the cleat may readily be understood I have indicated in Figures 1 and 2 a portion of a vehicle wheel having a pneumatic tire T and its inner tube I, together with the usual metallic rim R for the wheel.

The arched, or U-shaped cleat, or traction device of my invention, includes a pair of opposed clasping tongues 1 and 2 that are curved to conform to the exterior surface of the tire for close frictional contact therewith and these tongues are centrally pivoted together by a transverse rivet or bolt 3 having retaining heads 4.

The inner faces of these tongues are fashioned with grooves 5, and the edges or walls of the grooves are provided with integral upset flanges or lugs 6 and 7, spaced apart, and adapted to receive and retain a bowed or U-shaped spring 8 that extends through the grooves and resiliently unites the tongues. These tongues may readily be spread apart against tension of the spring, and slipped over the outer periphery of the wheel tire, and then the spring clasps the tongues against the outer and inner walls of the wheel tire with ample friction to retain the cleat in place as the wheel is turned.

Each of the tongues is equipped with an integral ground-engaging or traction lug, as 9 and 10, and the outer face of each lug is concaved, as at 11 to assist in gripping the ground surface.

As indicated in the drawings each traction lug or ground-engaging lug is disposed at an obtuse angle from a line passing transversely through the axis of the pivot bolt, and by this construction and arrangement of a tongue and its traction lug, the lug forms the short arm and the tongue forms the longer, clasping arm of a lever that is actuated by pressure of weight on the ground to rigidly clasp the two arms or tongues about the wheel tire.

Thus, in extricating a stalled vehicle, the cleat is resiliently attached to the wheel tire, and as the wheel is turned the two traction lugs engage the ground surface and by pressure against the lugs the tongues swing inwardly on their pivot to clasp or grip the wheel tire with sufficient rigidity to hold the cleat in operative position, and prevent spinning of the wheel.

One or two of the cleats may be mounted on a wheel for emergency purposes, and they may easily be removed from the wheel while not in ground engaging position.

Having thus fully described my invention, what I claim as new and desire to secure by Letters Patent is:

1. In a U-shaped detachable cleat for a pneumatic tire, the combination with a pair of curved attaching tongues having a central pivot, and resilient means engaging the inner surfaces of said attaching tongues for drawing together the tongues, of a pair of opposed pressure actuated traction lugs on the tongues extending laterally of the pivot in opposed relation to each other for the purpose described.

2. In a U-shaped detachable cleat for a pneumatic tire, the combination with a pair of curved attaching tongues having a central pivot, and a U-shaped clamping spring engaging the inner surfaces of said attaching tongues for uniting the tongues, of a pair of opposed integral pressure-actuated lugs extended at obtuse angles from the pivot for the purpose described.

3. In a U-shaped cleat for a pneumatic tire, the combination with a pair of clasping tongues having inner grooves and retaining lugs along the edges of the grooves, and a bowed spring engaging the inner surfaces of said clasping tongues and retained by said lugs, of a pair of lever-lugs integral with the tongues and disposed at obtuse angles from the pivot for frictional engagement with a bearing surface.

4. In a U-shaped cleat for a pneumatic tire, the combination with a pair of opposed clasping tongues having grooves in their inner faces, and spaced integral flanges along the edges of the grooves, a bowed spring uniting the tongues and retained by said flanges, and a central pivot for the tongues, of a pair of traction lugs integral with the tongues and extending from the pivot at opposed obtuse angles, and said traction lugs each having a concave ground engaging surface.

GRANT MILLER.

REFERENCES CITED

The following references are of record in the file of this patent:

UNITED STATES PATENTS

| Number | Name | Date |
|---|---|---|
| 1,468,582 | Stockard | Sept. 18, 1923 |
| 1,499,036 | Smith | June 24, 1924 |
| 2,445,947 | Hoppes | July 27, 1948 |